United States Patent
Hiruma

(10) Patent No.: US 9,973,655 B2
(45) Date of Patent: May 15, 2018

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Junichi Hiruma, Hidaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 13/896,236

(22) Filed: May 16, 2013

(65) Prior Publication Data
US 2013/0308155 A1 Nov. 21, 2013

(30) Foreign Application Priority Data

May 21, 2012 (JP) .................... 2012-115756

(51) Int. Cl.
| G06F 15/00 | (2006.01) |
|---|---|
| H04N 1/44 | (2006.01) |
| G06F 3/12 | (2006.01) |
| H04N 1/00 | (2006.01) |

(52) U.S. Cl.
CPC ......... *H04N 1/4413* (2013.01); *H04N 1/4426* (2013.01); *H04N 1/00244* (2013.01); *H04N 2201/0039* (2013.01); *H04N 2201/0094* (2013.01)

(58) Field of Classification Search
CPC ... G06F 21/608; G06F 3/1238; H04N 1/4413; H04N 1/4426; H04N 1/00244; H04N 2201/0094

USPC .......... 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| 2002/0087639 A1 | 7/2002 | Quine | |
|---|---|---|---|
| 2004/0230663 A1* | 11/2004 | Ackerman | H04N 1/00132 709/207 |
| 2011/0265144 A1* | 10/2011 | Ikeda | G06F 21/608 726/3 |
| 2013/0286420 A1* | 10/2013 | Tonegawa | 358/1.13 |

FOREIGN PATENT DOCUMENTS

| CN | 001307283 A | 8/2001 |
|---|---|---|
| CN | 102238172 A | 11/2011 |
| JP | 2007-259449 A | 10/2007 |
| JP | 2008-005023 A | 1/2008 |
| JP | 2011-234126 A | 11/2011 |

* cited by examiner

*Primary Examiner* — Thierry L Pham
(74) *Attorney, Agent, or Firm* — Canon U.S.A., Inc. IP Division

(57) ABSTRACT

An image processing apparatus includes an acceptance unit configured to accept entry of a user ID, a setting unit configured to, if authentication of a user based on the user ID is successful, set a remaining portion after deletion of domain information from the user ID as a portion of path information of a folder, which becomes a destination of image data, and a transmission unit configured to transmit the image data to the folder indicated by the path information as the destination.

18 Claims, 12 Drawing Sheets

FIG. 4A

LOGIN

USER ID — usera ~401

PASSWORD — xyz ~402

LOGIN DESTINATION — Domein A ▼ ~403

FIG. 4B

LOGIN

USER ID — domainb¥usera ~404

PASSWORD — xyz ~405

LOGIN DESTINATION — Domein B ▼ ~406

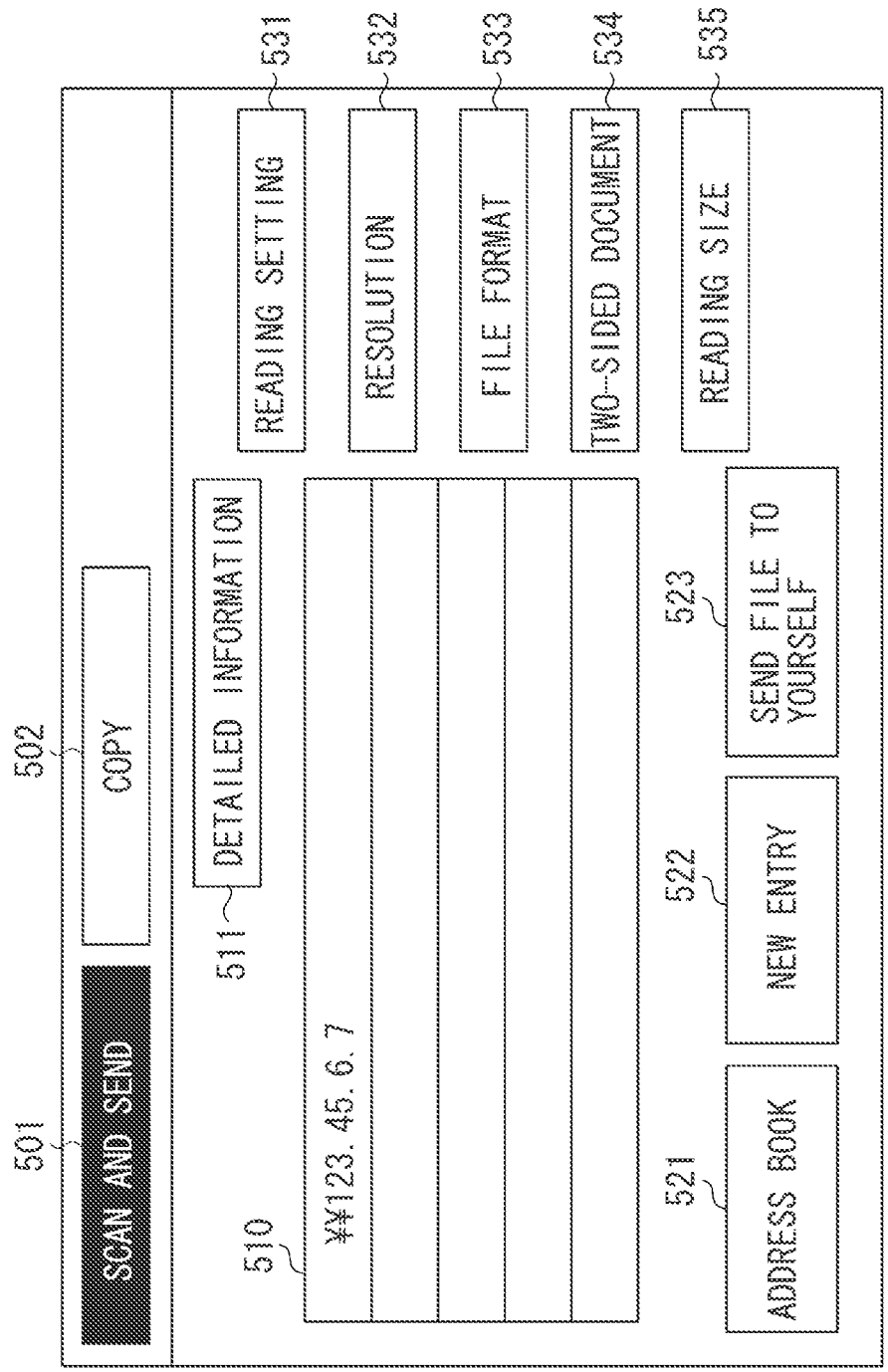

FIG. 8A

DETAILED INFORMATION OF DESTINATION

PATH  ¥¥123.45.6.7¥SHARED¥usera ~801

USER NAME  usera ~802

PASSWORD  xyz ~803

FIG. 8B

DETAILED INFORMATION OF DESTINATION

PATH  ¥¥123.45.6.7¥SHARED¥usera ~804

USER NAME  domainb¥usera ~805

PASSWORD  xyz ~806

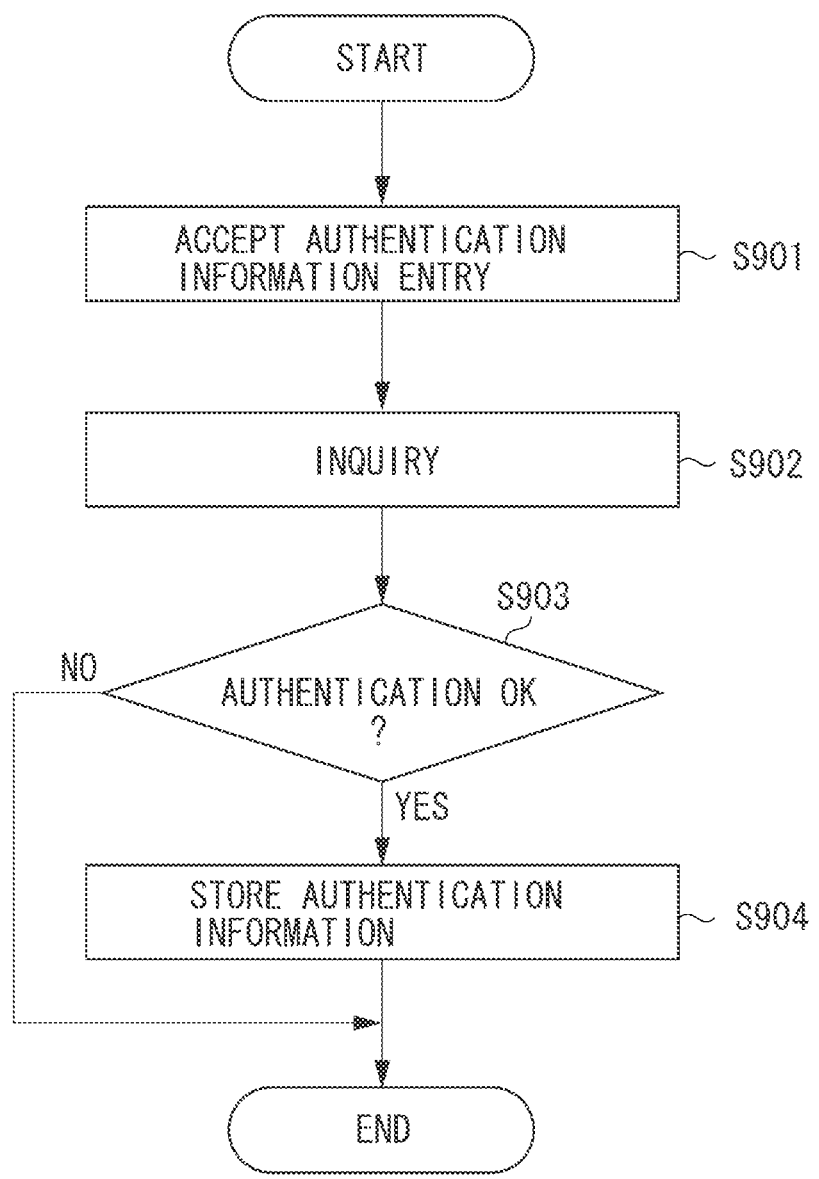

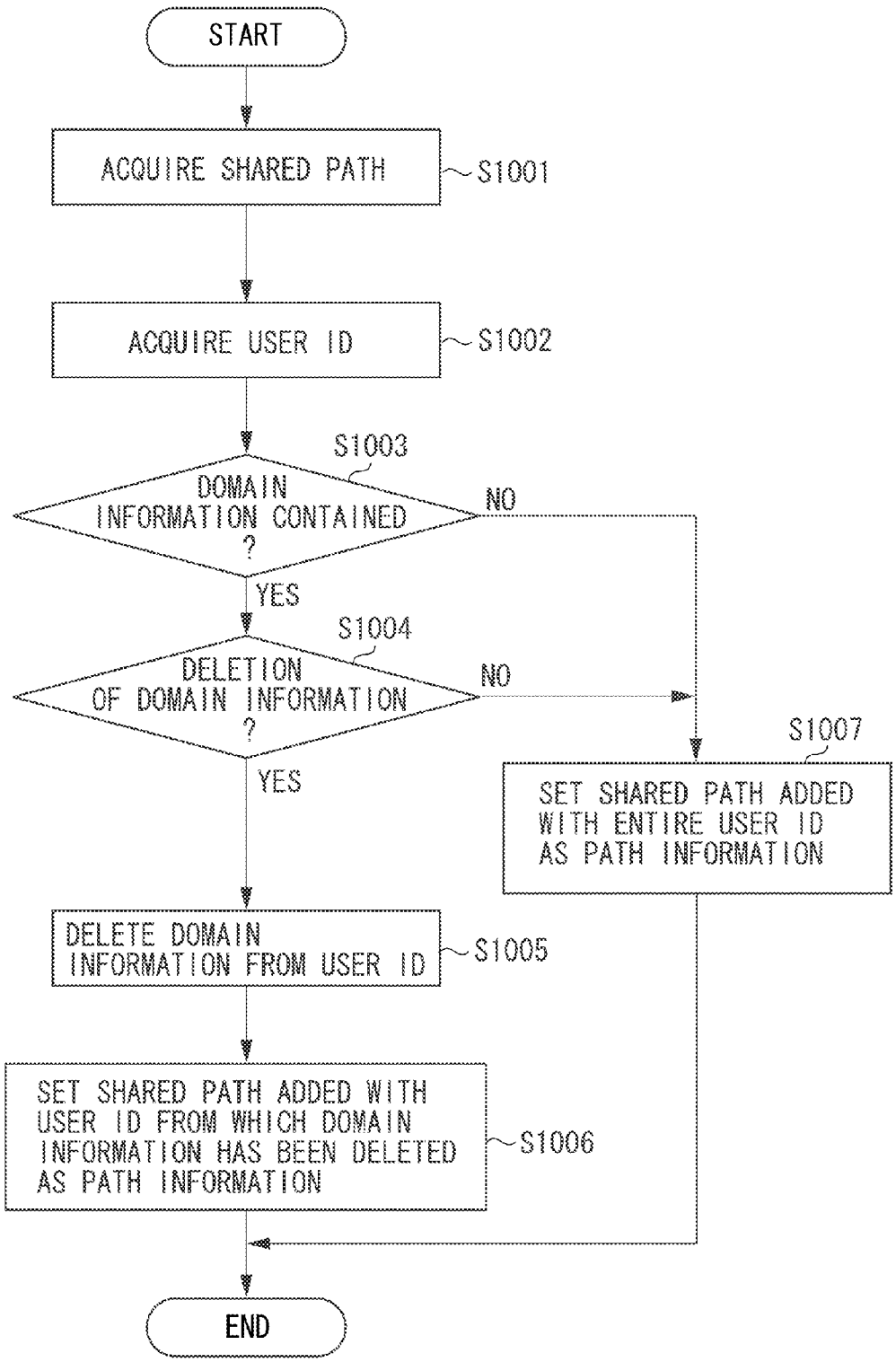

IMAGE PROCESSING APPARATUS, METHOD FOR CONTROLLING IMAGE PROCESSING APPARATUS, AND STORAGE MEDIUM

BACKGROUND

Field

Aspects of the present invention generally relate to an image processing apparatus capable of transmitting image data, a method for controlling the image processing apparatus, and a storage medium.

Description of the Related Art

Conventionally, it is known that a file which contains image data is sent from an image processing apparatus such as a multifunction peripheral (MFP). As a sending protocol for file transmission, for example, Japanese Patent Application Laid-Open No. 2011-234126 discusses a technique for transmitting image data using a server message block (SMB). Further, as another example, it is known that image data is transmitted using a distributed authoring and versioning protocol for the WWW (WebDAV). As yet another example, it is known that image data is sent using a file transfer protocol (FTP).

In case of performing such file transmission, path information indicating a host name of a file server that manages a folder, which becomes a storage destination of the image data, and a position of the folder, and authentication information (a user name and a password) for accessing the file server are necessary.

When an image data file is sent from the image processing apparatus, a user, who operates the image processing apparatus, may want to send and store the image data to own folder as a destination. In that case, there is a problem that it takes time and labor for the user to enter path information of the own folder.

To deal with this problem, it is possible to automatically set path information of the folder for individual user, using a user ID which the user has entered when logging in to the image processing apparatus. Accordingly, the user is freed from time and effort to enter path information of the own folder for each sending, or to select the path information of the own folder from many pieces of path information registered on an address book.

In particular, if path information is generated in a manner that the user ID, which the user has entered, is added next to shared path, which is preset as common to a plurality of users, folders of respective users will be generated in a common layer within the file server. This has an advantage that management becomes easy for an administrator.

On the other hand, a domain controller (a domain server) is used in increasing frequency for logging in to the image processing apparatus. The domain controller is a server that manages account information of a specific domain in an integrated fashion. By using the domain controller, the necessity for managing account information for each apparatus is eliminated.

In the domain controllers, a type of requiring addition of domain information at the head of the user ID to be used for authentication and a type of not requiring addition of domain information exist. For example, in a case where user-unique information is "userx" and domain information is "Domainx", when the former domain controller is used, "domainx¥userx" must be entered as the user ID. When the latter domain controller is used, it is only necessary to enter "userx" as the user ID. The symbol "¥" is a separator, which indicates that domain information comes ahead of the symbol, and user-unique information comes next to the symbol. Separators of "@" and "\" (a back slash) other than "¥" are known.

In this way, in an environment where a case of containing the domain information in the user ID and a case of not containing the domain information are mixed, inconvenience occurs when the user ID at the time of login is used as a portion of the path information of the folder. The reason is that, when "domainx¥userx" is used as the user ID, the image data will be stored in a folder of one level deeper layer, as compared with a case where "userx" is used as the user ID. When two types of domain controllers are used together in this way, the users' folders will be distributed in different layers, and management will become troublesome. Further, there is also a possibility that the image data is stored in a folder of the user's unintended layer.

SUMMARY

Aspects of the present invention generally relate to a mechanism for setting a remaining portion after deletion of domain information from a user ID used for authentication of a user as a portion of path information of a folder, which becomes a destination of image data.

According to an aspect of the present invention, an image processing apparatus includes an acceptance unit configured to accept entry of a user ID, a setting unit configured to, if authentication of a user based on the user ID is successful, set a remaining portion after deletion of domain information from the user ID as a portion of path information of a folder, which becomes a destination of image data, and a transmission unit configured to transmit the image data to the folder indicated by the path information as the destination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B are diagrams illustrating operation screens of the MFP according to the exemplary embodiment.

FIG. 7 is a diagram illustrating an operation screen of the MFP according to the exemplary embodiment.

FIGS. 8A and 8B are diagrams illustrating operation screens of the MFP according to the exemplary embodiment.

FIG. 9 is a flowchart illustrating login operation of the MFP according to the exemplary embodiment FIG. 10 is a flowchart illustrating path information setting operation of the MFP according to the exemplary embodiment.

DESCRIPTION OF THE EMBODIMENTS

Various exemplary embodiments, features, and aspects of the invention will be described in detail below with reference to the drawings.

The exemplary embodiment described below is not intended to be limiting according to the scope of claims, and all the combinations of features described in the exemplary embodiment are not always essential for implementation.

Figure 1:
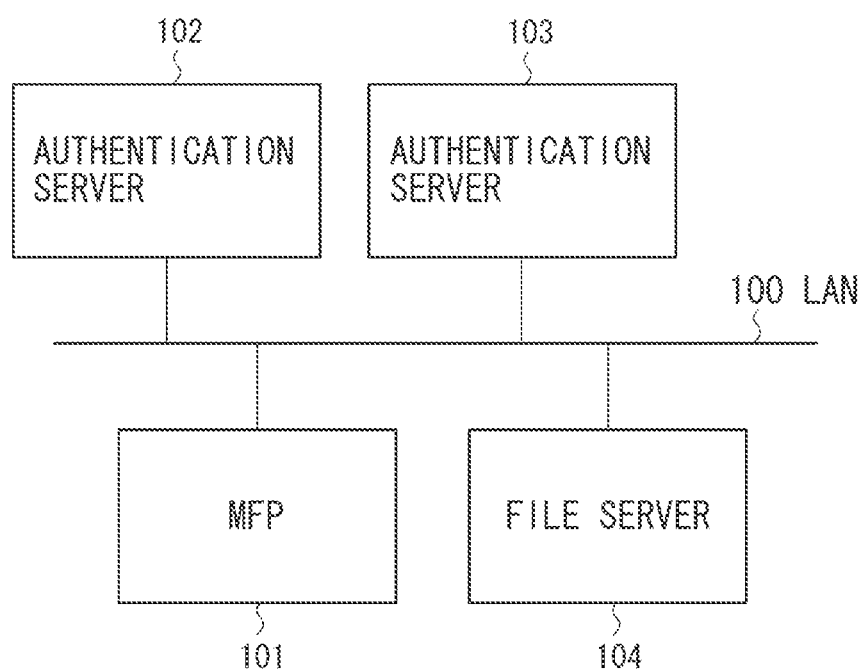
FIG. 1 is a general diagram illustrating an image processing system according to an exemplary embodiment.

FIG. 1 is a general diagram illustrating an image processing system. On a local area network (LAN) 100, an MFP 101, authentication servers 102 and 103, a file server 104 are connected with each other for communication. The MFP 101 is an example of the image processing apparatus. In the present exemplary embodiment, the MFP will be described as an example of the image processing apparatus, but, as long as an apparatus has the function of sending image data, such as a scanner apparatus with a single function, the apparatus does not have to be an MFP. The authentication servers 102 and 103 are examples of an authentication apparatus.

A file server 104 is an example of a file management apparatus. The MFP 101 can perform file transmission of image data using SMB or FTP, or WebDAV, to a folder within the file server 104 as a destination. Further, the MFP 101 can send image data by an electronic mail via a mail server (not illustrated).

The authentication servers 102 and 103 each have the function of the domain controller. The authentication server 102 manages a domain of "Domain A", and the authentication server 103 manages a domain of "Domain B". When a user of the MFP 101 logs in to the "Domain A", the user is authenticated by the authentication server 102. When logging in to the "Domain B", the user is authenticated by the authentication server 103.

The image processing system is assumed to include the MFP 101, the authentication servers 102 and 103, and the file server 104, but only the MFP 101 and the authentication servers 102 and 103, or only the MFP 101 may be also referred to as the image processing system.

Figure 2:
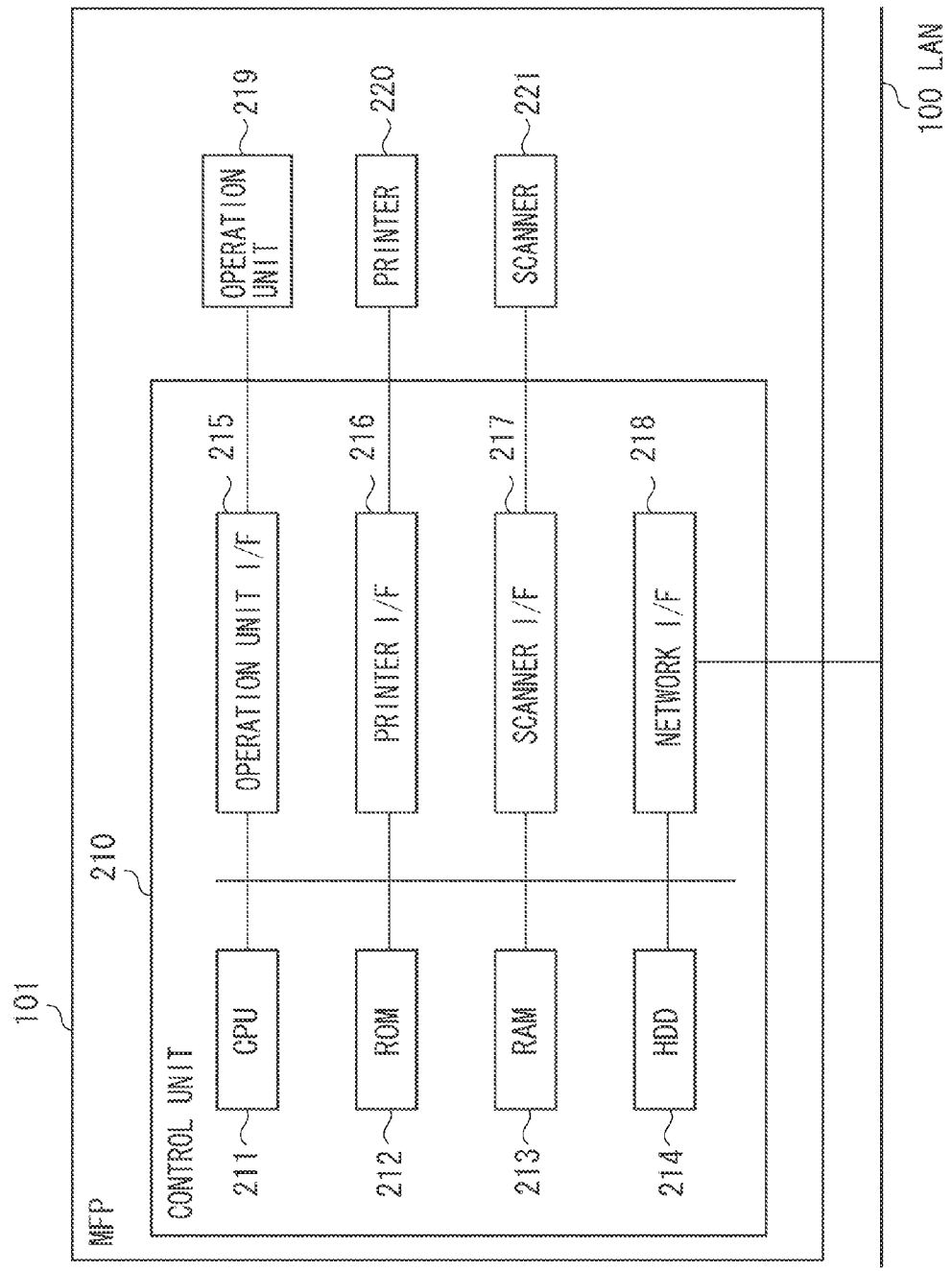
FIG. 2 is a block diagram illustrating a configuration of an MFP according to the exemplary embodiment.

FIG. 2 is a block diagram illustrating a configuration of the MFP 101. A control unit 210 including a central processing unit (CPU) 211 controls an entire operation of the MFP 101. The CPU 211 reads control programs stored in a read-only memory (ROM) 212 and performs various types of control such as reading control or sending control. A random access memory (RAM) 213 is used as a temporary storage area, such as a main memory or a work area of the CPU 211. The MFP 101 assumes a mode in which the single CPU 211 executes respective processing illustrated in the flowchart described below using a single memory (the RAM 213 or a hard disk drive (HDD) 214), but another mode is also acceptable. For example, respective processing illustrated in the flowchart described below can be also executed by causing a plurality of CPUs or a plurality of RAMs or HDDs to cooperate with each other.

The HDD 214 stores image data or various types of programs. An operation unit interface (I/F) 215 connects an operation unit 219 and the control unit 210. The operation unit 219 is provided with a liquid crystal display having a touch panel function and a keyboard and the like, and acts as an acceptance unit that accepts instructions of the user.

A printer I/F 216 connects a printer 220 and the control unit 210. The image data which is printed by the printer 220 is transferred from the control unit 210 via the printer I/F 216, and printed on a recording medium in the printer 220.

A scanner I/F 217 connects a scanner 221 and the control unit 210. The scanner 221 reads an image on a document to generate image data (an image file), and inputs the image to the control unit 210 via the scanner I/F 217. The MFP 101 can perform file transmission or mail sending of the image data (the image file) generated by the scanner 221.

A network I/F 218 connects the control unit 210 (the MFP 101) to the LAN 100. The network I/F 218 transmits image data and information to external apparatuses (e.g., the authentication servers 102 and 103 and the file server 104) over the LAN 100, and receives various types of information from the external apparatuses over the LAN 100.

Figure 3:
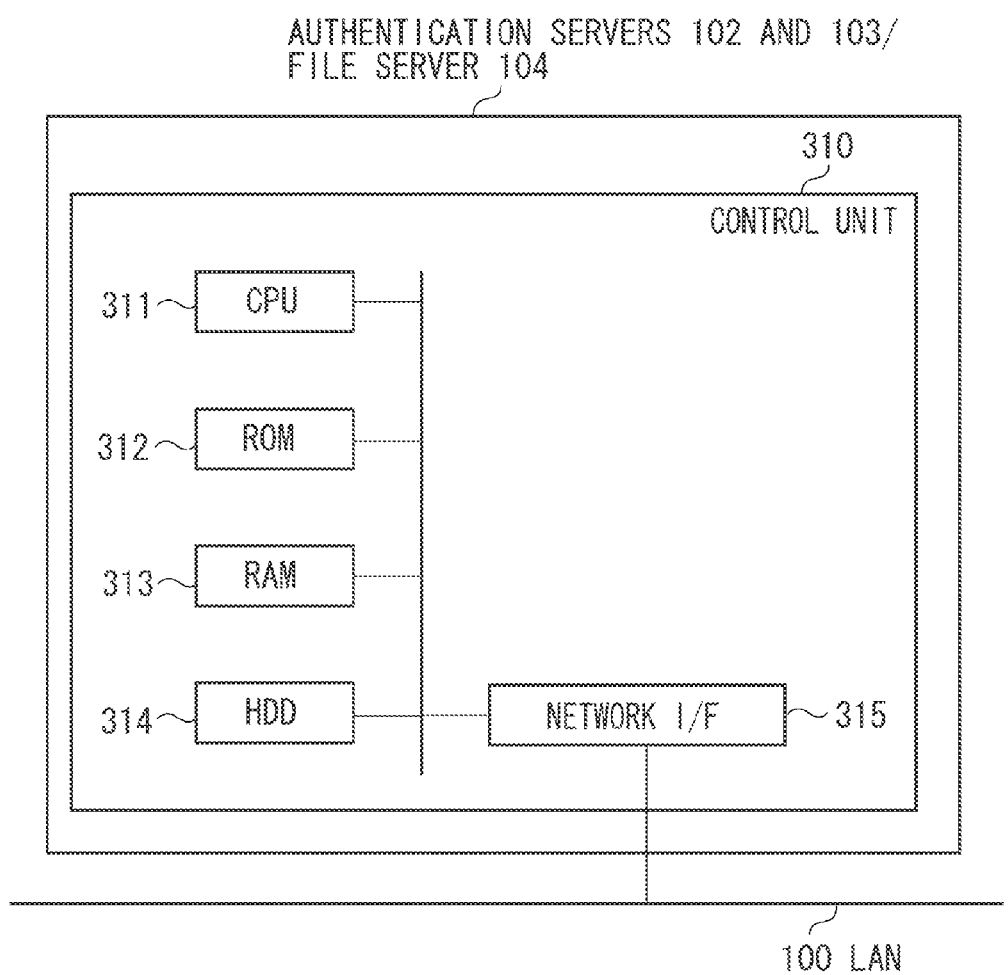
FIG. 3 is a block diagram illustrating a configuration of authentication servers and a file server according to the exemplary embodiment.

FIG. 3 is a block diagram illustrating a configuration of the authentication server 102. A control unit 310 including a CPU 311 controls operation of the entire authentication server 102. The CPU 311 reads control programs stored in a ROM 312 to execute various types of control processing. A RAM 313 is used as a temporary storage area, such as a main memory and a work area of the CPU 311. It is assumed that the authentication server 102 has a mode in which the single CPU 311 executes respective processing illustrated in the flowchart described below using a single memory (the RAM 313 or a HDD 314), but another mode is acceptable. For example, by causing a plurality of CPUs or a plurality of RAMs or HDDs to cooperate with each other, respective processing illustrated in the flowchart described below may be also executed.

The HDD 314 stores image data or various types of programs. A network I/F 315 connects the control unit 310 (the authentication server 102) to the LAN 100. The network I/F 315 transmits and receives various types of information among other apparatuses over the LAN 100. The configuration of the authentication server 103 and the file server 104 are similar to that of the authentication server 102 (FIG. 3), and, therefore, descriptions of the configuration will not be repeated.

FIGS. 4A and 4B are diagrams illustrating examples of operation screens displayed on the operation unit 219. Before initiating use of the MFP 101, the user needs to enter user ID into a field 401 and a password into a field 402, respectively. Further, the user needs to select a domain of a login destination from options indicated in a drop-down format in a field 403. In this case, "Domain A" managed by the authentication server 102 and "Domain B" managed by the authentication server 103 are indicated as options.

When the user instructs execution of login in a state illustrated in FIG. 4A, the MFP 101 transmits "usera" and "xyz" to the authentication server 102, and requests user authentication (inquires whether use of the MFP 101 by the user is permitted). Similarly, when the user instructs execution of login in a state illustrated in FIG. 4B, the MFP 101 sends "domainb¥ usera" and "xyz" to the authentication server 103, and requests user authentication (inquires whether use of the MFP 101 by the user is permitted).

When the field 401 in FIG. 4A and a field 404 in FIG. 4B are compared, it is found that a character string of "domainb¥" is added to the field 404. The "domainb" of the character string is domain information corresponding to "Domain B" managed by the authentication server 103. Further, the symbol "¥" is a separator, which indicates that domain information comes ahead of the symbol, and user-unique information comes next to the symbol. The separators of "@" and "\" (backslash) in addition to "¥" are known.

The reason why the domain information is added to the field 404 is that the authentication server 103 is a domain controller of a type that requires addition of the domain information at the head of the user ID. On the other hand, the authentication server 102 is a domain controller of a type that does not require addition of the domain information at the head of the user ID, and, accordingly, the domain information is not added to the field 401. In this way, the user needs to determine whether to add the domain information to the user ID, depending on a domain selected as a login destination.

Figure 5:
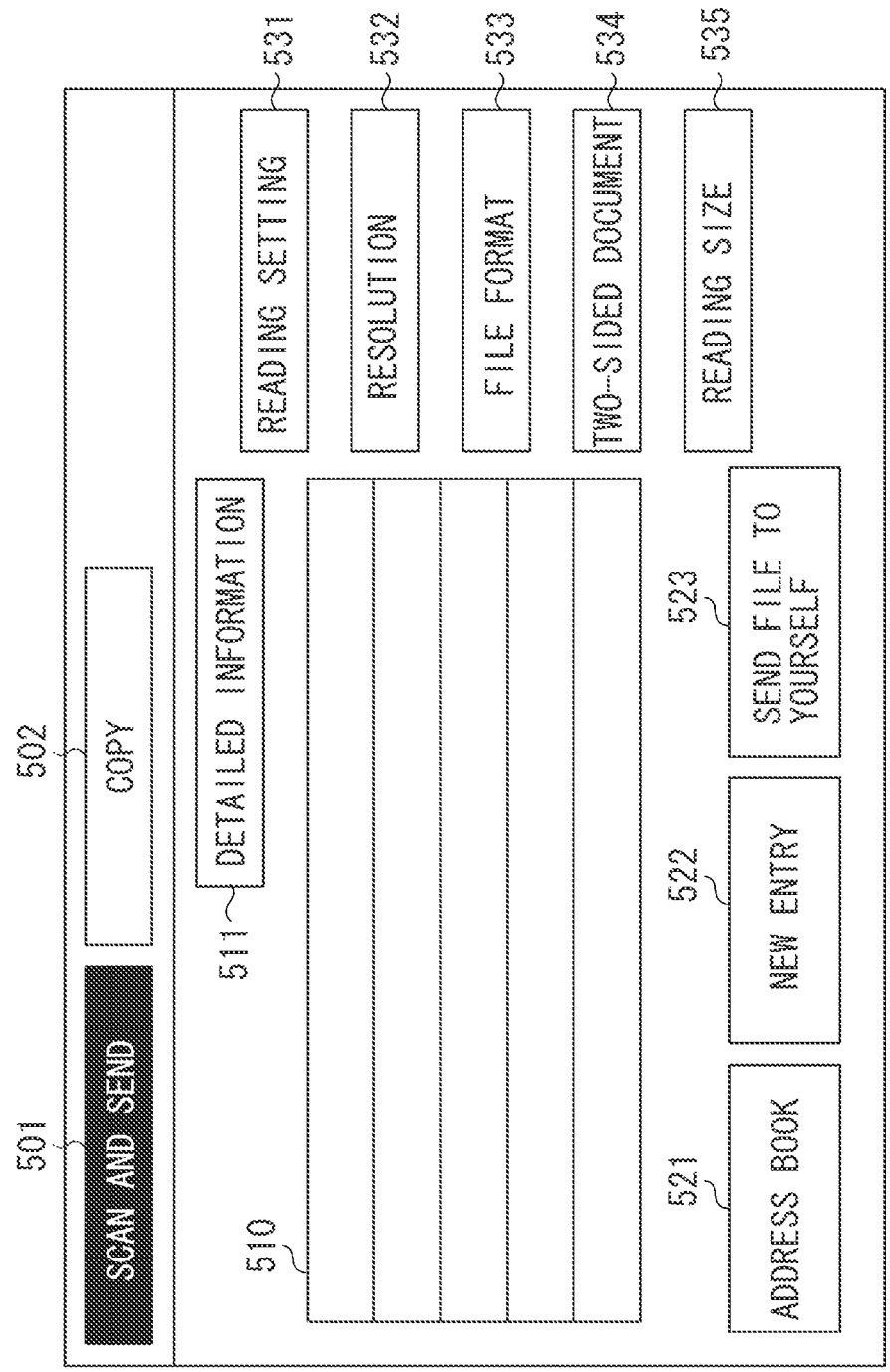
FIG. 5 is a diagram illustrating an operation screen of the MFP according to the exemplary embodiment.

FIG. 5 is a diagram illustrating an example of an operation screen displayed on the operation unit 219. The user can select a function by operating an operation key 501 or 502 in the screen in FIG. 5. FIG. 5 indicates a state where the operation key 502 is operated. In FIG. 5, "scan and send" and "copy" are illustrated as functions, but the MFP 101 may be provided with functions other than these.

The user, who has operated the operation key 501, can set a destination of the image data to be sent, by operating either one of operation keys 521, 522, and 523. When the operation key 521 is operated, a content of an address book stored in the HDD 214 is displayed, and the user can set an address as a destination of the image data while referring to the content registered on the address book.

When the user operates the operation key 522, a screen which accepts a new entry from the user is displayed. The user can enter destination information on the displayed screen, and can set the entered destination information as a destination of the image data.

The operation key 523 is an operation key operated when the user wants to set own folder as a destination of the image data. When the user operates the operation key 523, path information of the user's own folder is automatically set as a destination of the image data (the details will be described below).

In a field 510, the destinations, which have been set using the operation keys 521 through 523, are indicated. When an operation key 511 is operated in a state where one of the destinations displayed in the field 510 is selected, detailed information of the selected destination is displayed (refer to FIGS. 8A and 8B).

An operation key 531 is an operation key to be used when reading setting, such as color/monochrome or the like, is performed. An operation key 532 is an operation key to be used when reading resolution is set. An operation key 533 is an operation key to be used when a file format of the image data to be sent is set. An operation key 534 is an operation key to be used when setting of one-sided/two-sided reading is performed. An operation key 535 is an operation key to be used when reading size is set.

Figure 6:
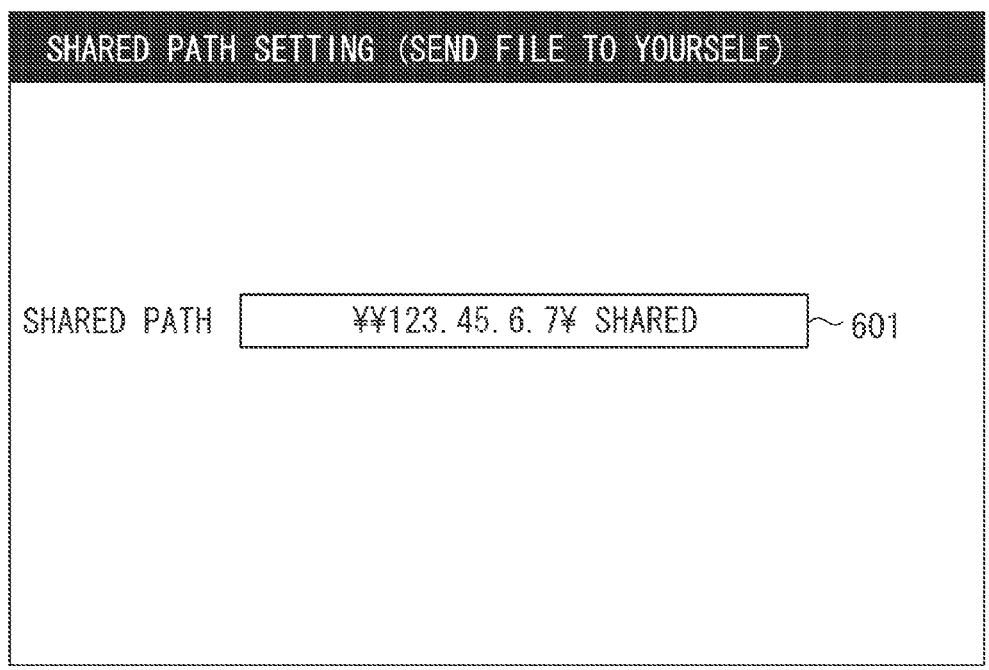
FIG. 6 is a diagram illustrating an operation screen of the MFP according to the exemplary embodiment.

FIG. 6 is a diagram illustrating an example of an operation screen displayed on the operation unit 219. The screen in FIG. 6 can be operated only by an administrator, and, therefore, in a case where general users operate the MFP 101, the screen is not displayed. Into the field 601, shared path which is used in common by a plurality of users is entered. The shared path which has been set here is stored in the RAM 213, and is used as path information of a folder which becomes a storage destination of the image data in combination with the user ID entered into the field 401 in FIG. 4A, or a portion of the user ID entered into the field 404 in FIG. 4B.

In a state where the shared path is set as illustrated in FIG. 6, when the operation key 523 in FIG. 5 is operated, the screen in FIG. 5 shifts to a state illustrated in FIG. 7. On the screen in FIG. 7, a destination of ¥¥123. 45. 6. 7 is displayed in the field 510. In this case, a portion which corresponds to a host name of the file server 104 out of the shared path set in the field 601 in FIG. 6 is displayed. When the operation key 511 is operated in a state where "¥¥123. 45. 6. 7" displayed in the field 510 is selected, a screen in FIG. 8A or 8B is displayed.

FIGS. 8A and 8B are diagrams illustrating examples of operation screens displayed on the operation unit 219. FIG. 8A illustrates an example in a case where the user, who has logged in a state illustrated in FIG. 4A, operates the operation key 523. In a field 801, there is set path information of "¥¥123. 45. 6. 7¥shared¥usera", combined with "¥¥123. 45. 6. 7¥shared" of the shared path and "usera" of the user ID entered into the field 401 in FIG. 4A.

In a field 802, "usera" of the user ID entered into the field 401 in FIG. 4A is set as a user name of authentication information to be used for connection to the file server. Further, in a field 803, "xyz" of the password entered into the field 402 in FIG. 4A is set as a password of the authentication information to be used for the connection to the file server.

FIG. 8B illustrates an example in a case where the user, who has made login in a state illustrated in FIG. 4B, operates the operation key 523. In a field 804, there is set path information of "¥¥123. 45. 6. 7¥shared¥usera", combined with "¥¥123. 45. 6. 7¥shared" of the shared path and a portion of "domainb¥usera" of the user ID entered into the field 404 in FIG. 4B. By setting the path information to the one excluding "domainb¥" instead of "¥¥123. 45. 6. 7¥shared¥domainb¥usera", the image data can be stored in a folder of the same "usera", in both cases of FIG. 4A and FIG. 4B. Accordingly, management of the users' folders by the administrator becomes easy, and image data may be prevented from being stored in the user's unintended folder.

In a field 805, "domainb¥usera" of the user ID entered into the field 404 in FIG. 4B is set as a user name of authentication information to be used for connection to the file server. In this case, "domainb¥" is deleted and contained as it is. Further, in a field 806, there is set "xyz" of the password entered into the field 405 in FIG. 4B as a password of the authentication information to be used for the connection to the file server.

FIG. 9 is a flowchart illustrating login operation (a series of operations when the user begins to use the MFP 101) in the MFP 101. The respective operations (steps) illustrated in the flowchart of FIG. 9 are realized by executing control programs stored in the HDD 214 by the CPU 211 of the MFP 101.

In step S901, the CPU 211 accepts an entry of the user ID and the password from the user, via the screen (FIGS. 4A and 4B) displayed on the operation unit 219.

In step S902, the CPU 211 sends the user ID and the password accepted in step S901 to the authentication server 102 or 103, and requests user authentication (inquires whether use of the MFP 101 by the user is permitted). The authentication server of a sending destination can be switched depending on selection of a login destination using a field 403 in FIG. 4A.

In step S903, the CPU 211 determines whether a content notified from the authentication server is authentication OK or authentication NG. As a result, if authentication is OK (YES in step S903), the processing proceeds to step S904. In step S904, the CPU 211 permits use of respective functions of the MFP 101 by the user, and stores in the RAM 213 the user ID and the password accepted in step S901. On the other hand, if authentication is NG (NO in step S903), the CPU 211 directly ends the processing (or the CPU 211 returns the processing to step S901, and redisplays the screen for entering the user ID and the password).

FIG. 10 is a flowchart illustrating path information setting operation in the MFP 101. The flowchart in FIG. 10 is started when the operation key 523 is operated. The respective operations (steps) illustrated in the flowchart in FIG. 10 are realized by causing the CPU 211 of the MFP 101 to execute control programs stored in the HDD 214.

In step S1001, the CPU 211 acquires shared path entered into the field 601 in FIG. 6, and stored in the HDD 214. In step S1002, the CPU 211 acquires the user ID accepted in step S901 and stored in the RAM 213 in step S904.

In step S1003, the CPU 211 determines whether domain information is contained in the user ID acquired in step S1002. Specifically, if a separator "¥" is contained in the user ID acquired in step S1002, it is determined that domain information is contained (YES in step S1003), the processing proceeds to step S1004. On the other hand, if the separator "¥" is not contained in the user ID acquired in step S1002, it is determined that the domain information is not contained (NO in step S1003), the processing proceeds to step S1007.

In step S1004, the CPU 211 determines whether to delete the domain information from the user ID acquired in step S1002. Whether to delete the domain information from the user ID has been set in advance by the administrator via the screen in FIG. 11.

Figure 11:
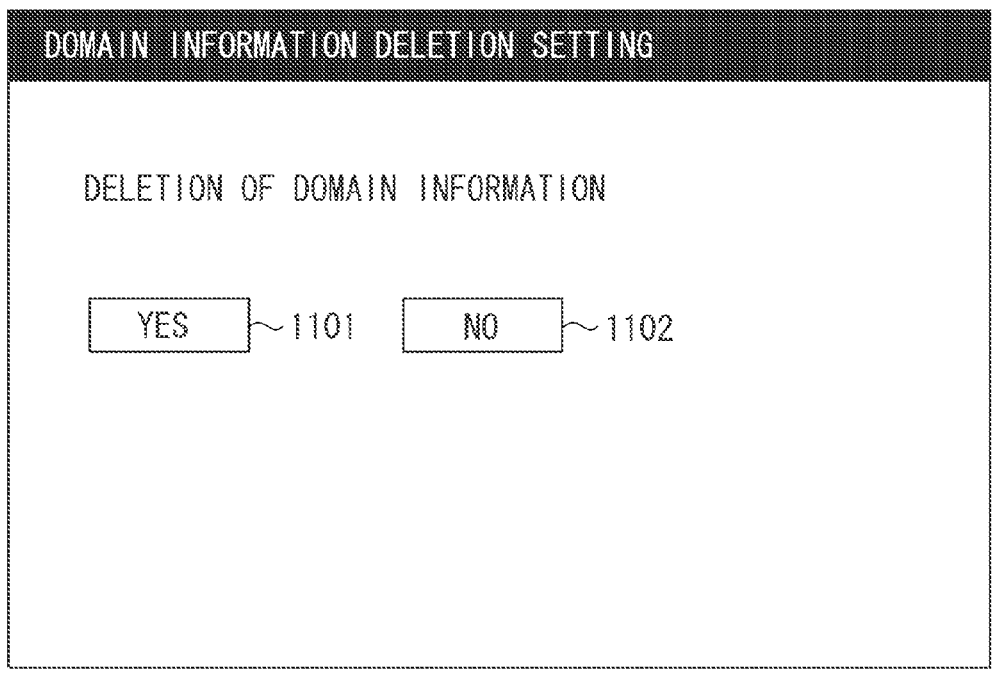
FIG. 11 is a diagram illustrating an operation screen of the MFP according to the exemplary embodiment.

FIG. 11 is a diagram illustrating an example of an operation screen displayed on the operation unit 219. The screen in FIG. 11 can be operated only by the administrator, so that the operation screen is not displayed in a case where the general user operates the MFP 101. If the administrator operates the operation key 1101 on the screen in FIG. 11, deletion of the domain information from the user ID is selected. On the other hand, if the administrator operates the operation key 1102, the deletion of the domain information from the user ID is not selected. In this case, even when the domain information is contained in the user ID, the entire user ID is set as the path information without deletion of the domain information.

In step S1004, if deletion of the domain information from the user ID is selected (YES in step S1004), it is determined that the domain information is deleted, and the processing proceeds to step S1005. On the other hand, the deletion of the domain information from the user ID is not selected (NO in step S1004), it is determined that the domain information is not deleted, and the processing proceeds to step S1007.

In step S1005, the CPU 211 deletes the domain information from the user ID acquired in step S1002. Subsequently, in step S1006, the CPU 211 sets the shared path added, next thereto, with the user ID, from which the domain information has been deleted, as path information of the folder. On the other hand, in step S1007, the CPU 211 sets the shared path added, next thereto, with the entire user ID as path information of the folder. Without performing the determination in step S1004, the domain information may always be deleted in a case where the domain information is contained in the user ID.

Figure 12:
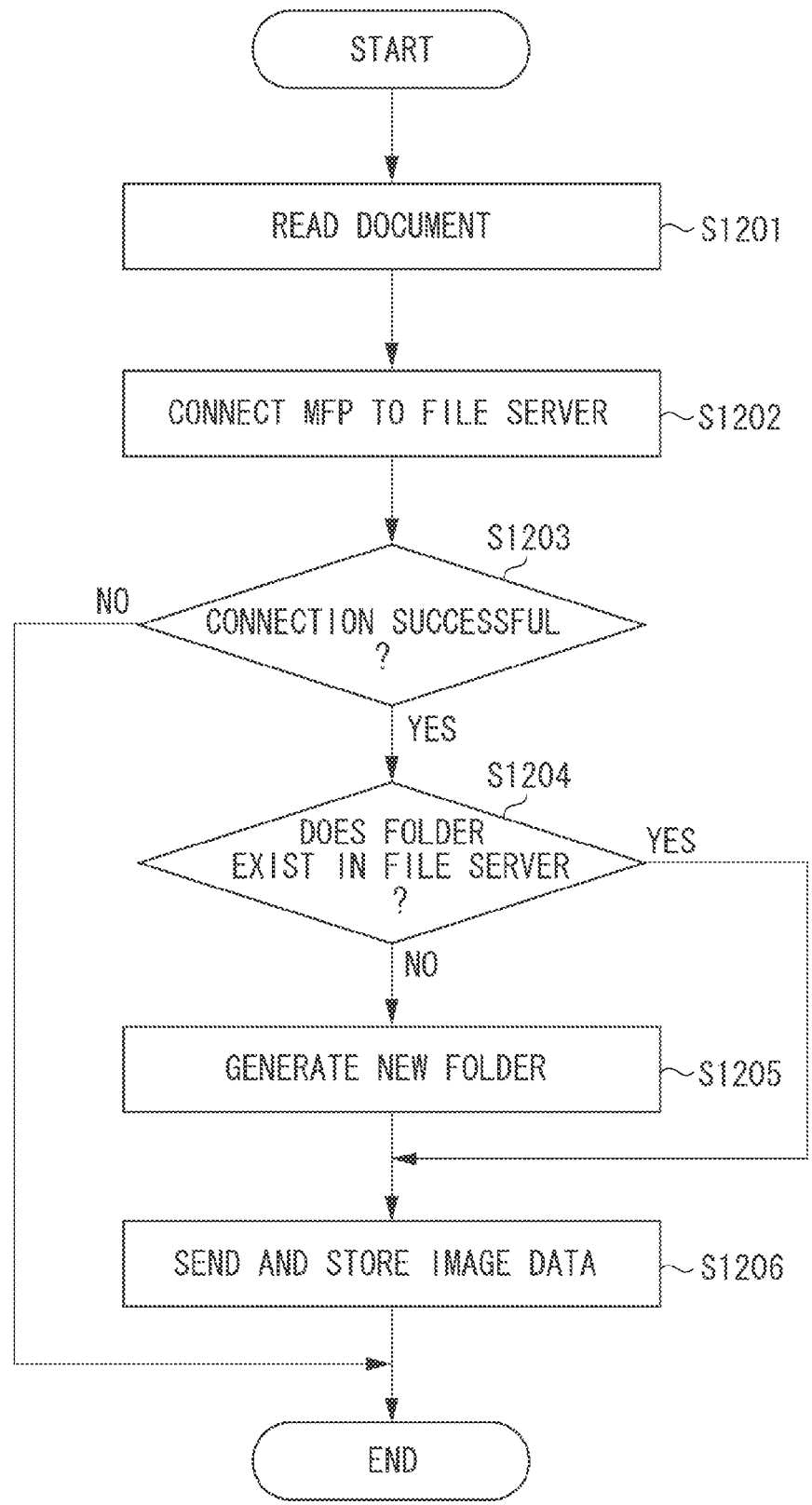
FIG. 12 is a flowchart illustrating transmission operation of the MFP according to the exemplary embodiment.

FIG. 12 is a flowchart illustrating transmission operation in the MFP 101. The flowchart in FIG. 12 is started in a case where a start key (not illustrated) is operated after a destination of the image data has been set. The respective operations (the steps) illustrated in the flowchart in FIG. 12 are realized by causing the CPU 211 of the MFP 101 to execute control programs stored in the HDD 214.

In step S1201, the scanner 221 reads an image on a document to generate image data. In step S1202, the CPU 211 connects the MFP 101 to the file server 104 in accordance with the path information set in step S1006 or S1007 of FIG. 10. At that time, the user name and the password displayed on the screens in FIGS. 8A and 8B are used for login to the file server 104.

In step S1203, the CPU 211 determines whether connection with the file server 104 is successful. If the connection with the file server 104 is successful (YES in step S1203), the processing proceeds to step S1204. If connection with the file server 104 is not successful (NO in step S1203), the CPU 211 directly ends the processing.

In step S1204, the CPU 211 determines whether a folder indicated by the path information, which has been set in step S1006 or S1007 in FIG. 10, exists in the file server 104. If the folder exists (YES in step S1204), the processing proceeds to step S1206. If the folder does not exist (NO in step S1204), the processing proceeds to step S1205.

In step S1205, the CPU 211 generate within the file server 104 a new folder indicated by the path information, which has been set in step S1006 or S1007 in FIG. 10. Specifically, the CPU 211 sends a command to request generation of a new folder to the file server 104. In a case where the folder indicated by the path information, which has been set in step S1006 or S1007 in FIG. 10, does not exist in the file server 104, the processing may be directly ended as error.

In step S1206, the CPU 211 sends image data to the file server 104, and stores the image data in the folder indicated by the path information, which has been set in step S1006 or S1007 in FIG. 10.

By the processing described above, even in a case where the domain information is contained in the user ID, the same folder as in a case where the domain information is not contained in the user ID can be easily set as a destination of the image data. In the above descriptions, it has been described by comparing a case where the single user of "usera" logs in with the user ID added with the domain information and a case where the same user of "usera" logs in with the user ID not added with the domain information. In that case, by deleting the domain information from the user ID, the image data is stored in the same folder in both cases. On the other hand, the exemplary embodiment of the present invention is effective even in a case where a user who logs in with the user ID added with the domain information and a user who logs in with the user ID not added with the domain information are different from each other in the first place. The reason is that the folders of respective users are generated in a parallel manner in the single layer, resulting in making it easier for the administrator to manage the folders.

Further, in the above descriptions, when the user starts to use the MFP 101, the example of authenticating the user in accordance with the flowchart in FIG. 9 has been described, but other modes are also acceptable. For example, after the user has selected a specific function, user authentication for using the function may be performed in accordance with the flowchart in FIG. 9.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that these disclosed exemplary embodiments are not limiting. The scope of the following claims is to be accorded the broadest interpretation so as to encompass all modifications, equivalent structures, and functions.

This application claims priority from Japanese Patent Application No. 2012-115756 filed May 21, 2012, which is hereby incorporated by reference herein in its entirety.

What is claimed is:

1. An image processing apparatus comprising:
    a receiving unit configured to receive a user ID and domain information;
    an executing unit configured to execute login of a user to the image processing apparatus based on at least the user ID and the domain information received by the receiving unit; and
    one key configured to set, as a storage destination of image data, a folder path of a folder of the user which is in a login state to the image processing apparatus; and
    a transmitting unit configured to transmit image data using the folder path set by the one key,
    wherein, using the user ID received by the receiving unit, the folder path which includes the user ID received by the receiving unit and does not include the domain information received by the receiving unit is set by the one key, and
    wherein at least one of the receiving unit, the executing unit, and the transmitting unit is implemented by a processor and a memory.

2. The image processing apparatus according to claim 1, further comprising a determination unit configured to determine whether the domain information is received by the receiving unit,
    wherein, if the determination unit determines that the domain information is received by the receiving unit, using the user ID received by the receiving unit as the storage destination of the image data, the folder path which includes the user ID received by the receiving unit and does not include the domain information received by the receiving unit is set by the one key, and
    wherein the determination unit is implemented by the processor and the memory.

3. The image processing apparatus according to claim 2, wherein the determination unit performs the determination based on a separator.

4. The image processing apparatus according to claim 2, further comprising a selection unit configured to select in advance whether to delete the domain information,
    wherein, if it is determined that the domain information is received by the receiving unit, when deletion of the domain information is selected, the folder path which includes the user ID received by the receiving unit and does not include the domain information received by the receiving unit as the storage destination of the image data, and, when deletion of the domain information is not selected, a folder path which includes the user ID received by the receiving unit and include the domain information received by the receiving unit is set by the one key as the storage destination of the image data, and
    wherein the selection unit is implemented by the processor and the memory.

5. The image processing apparatus according to claim 1, wherein, as the storage destination of the image data, a combination of a shared path portion used by a plurality of common users and the user ID is set by the one key.

6. The image processing apparatus according to claim 1, further comprising a reading unit configured to read an image to generate image data,
    wherein, as the storage destination of the image data generated by the reading unit, the folder path of the folder of the user which is in the login state to the image processing apparatus is set by the one key.

7. A method for controlling an image processing apparatus, the method comprising:
    receiving a user ID and domain information;
    executing login of a user to the image processing apparatus based on at least the received user ID and the received domain information;
    setting, by one key as a storage destination of image data, a folder path of a folder of the user which is in a login state in the image processing apparatus; and
    transmitting image data using the folder path set by the one key,
    wherein, using the received user ID, the folder path which includes the received user ID and does not include the received domain information is set by the one key.

8. A non-transitory computer-readable storage medium storing a program that causes a computer to execute a control method, comprising:
    a code to receive a user ID and domain information;
    a code to execute login of a user to an image processing apparatus based on at least the received user ID and the received domain information;
    a code to set, by one key as a storage destination of image data, a folder path of a folder of the user which is in a login state in the image processing apparatus; and
    a code to transmit image data using the folder path set by the one key,
    wherein, using the received user ID, the folder path which includes the received user ID and does not include the received domain information is set by the one key.

9. The image processing apparatus according to claim 1, further comprising a removing unit configured to remove the domain information received by the receiving unit,
    wherein the folder path includes a remaining portion after removal of the domain information by the removing unit.

10. The image processing apparatus according to claim 1, wherein the transmitted image data is stored in the storage destination.

11. The image processing apparatus according to claim 1, wherein the receiving unit further receives a password, and
    wherein the executing unit executes login of the user to the image processing apparatus based on the user ID, the domain information and the password received by the receiving unit.

12. A method for controlling an image processing apparatus, the method comprising:
    receiving a user ID and domain information;

executing a login process of a user to the image processing apparatus by using at least the user ID and the domain information;

displaying an operation portion for setting, as a storage destination of image data, a folder path of a folder of the user which is in a login state to the image processing apparatus; and setting, in accordance with operation of the operation portion, the folder path which includes the user ID used for the login process of the user and does not include the domain information used for the login process of the user.

13. The method according to claim 12, wherein the setting sets, in accordance with operation of the operation portion, the folder path by excluding the domain information from the user ID and the domain information used for the login process of the user.

14. The method according to claim 12, further comprising:

transmitting, to an authentication server, the received user ID and the domain information.

15. The method according to claim 14, wherein the receiving further receives a password, and wherein the transmitting transmits, to the authentication server, the received user ID, the domain information and the password.

16. The method according to claim 12, further comprising:

scanning an image on an original to generate image data; and transmitting the generated image data using the set folder path.

17. The method according to claim 12, further comprising:

receiving a shared path portion used by a plurality of common users, wherein the setting sets, in accordance with operation of the operation portion, the folder path which includes the received shared path portion and the user ID used for the login process of the user and does not include the domain information used for the login process of the user.

18. The method according to claim 14, wherein the login process of the user is a process of transmitting the received user ID and the domain information to the authentication server and permitting use of the image processing apparatus by the user upon successful authentication by the authentication server.

* * * * *